UNITED STATES PATENT OFFICE.

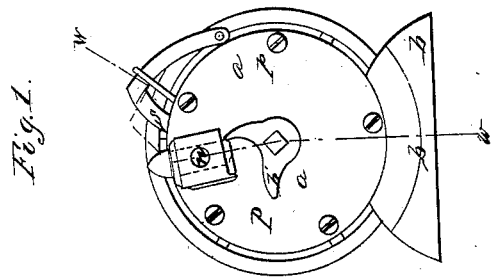

J. T. WARREN, OF STAFFORD, NEW YORK, ASSIGNOR TO HIMSELF AND ROBERT CHESBROUGH, OF SAME PLACE.

IMPROVEMENT IN ROTARY ENGINES.

Specification forming part of Letters Patent No. 49,594, dated August 22, 1865.

*To all whom it may concern:*

Be it known that I, J. T. WARREN, of Stafford, in the county of Genesee and State of New York, have invented a new and useful Improvement in Rotary Engines; and I do hereby declare that the following is a full, clear, and exact description thereof, which will enable those skilled in the art to make and use the same, reference being had to the accompanying drawings, forming part of this specification.

The present invention has for its object, and which is accomplished thereby, the production of an engine by which the force of steam is caused at once to impart a rotary or circular movement to the axis or shaft to be turned, and consists in the use of a hollow steam-tight cylinder, within the central portion of which, and turning in bearings thereof, a circular disk of considerably smaller diameter than the cylindrical chamber is inserted so as to freely turn therein, but with steam-tight joints, thus leaving an annular space or chamber between the periphery of the disk and its cylinder entirely around the same.

Attached to the periphery of the disk, or forming a part thereof, and projecting in a radial line therefrom across the annular chamber around the same, is a steam-tight piston, against which the steam as admitted to the said chamber through any suitably-arranged steam-port impinges, and by its expansive power causes said piston and its disk to move around within the cylinder, thus directly imparting a rotary motion to its shaft, to which the mechanical devices to be driven are connected by any ordinary arrangement of pulleys, belts, gears, &c.; and in connection with the piston, arranged and operating, as described, to prevent back-pressure upon the same by the steam, as well as to enable it to be exhausted from the cylinder after it has once been used therein, I insert at and between the steam and exhaust ports of the cylinder, in its annular steam-chamber, a dividing steam-tight partition-plate, which plate, as steam passes into the cylinder, prevents it from acting only in the proper direction to impel the piston, the steam on the other side thereof, and between it and the piston, then exhausting through the exhaust-port, and also is so arranged that when the piston in its rotary movement has reached it, or nearly so, as to be moved sufficiently thereby to allow the piston to pass freely by it without impediment, and then immediately afterward resume its original position, when it is again moved in the same manner by the next revolution of the piston, and so on as long as desired.

At the moment when the piston commences to pass by the partition-plate of the cylindrical chamber, as above described, the steam-valve is so operated through any proper-arranged devices as to close, and thus remains until the partition-plate resumes its original position, when it opens and steam admitted as before, the impetus of the balance-wheel of the engine acquired by the previous movement of the piston within the cylinder sufficing to throw the piston by the movable partition.

Having thus generally stated the arrangement of my improved rotary engine, I will now proceed to describe its construction in detail, reference being had to the accompanying plate of drawings, of which—

Figure 1 is an end view of the steam-cylinder, showing the steam-valve; Fig. 2, a sectional view in plane of line *w w*, Fig. 1; and Fig. 3, a similar view in plane of line *x x*, Fig. 2.

*a a* in the drawings represent a hollow steam-tight cylinder, placed vertically upon a bed-plate, *b*, to which it may be secured in any proper manner. Placed vertically within the chamber *c* of the cylinder *a*, and hung upon a shaft, *d*, having bearings in the center thereof, is a circular disk, *f*, of the same width as chamber *c*, but of considerably smaller diameter, leaving an annular space or chamber, *g*, entirely around the periphery thereof and the interior periphery of the cylinder *a*. The disk is made steam-tight, and is free to move around therein.

To the disk *f*, and projecting outward therefrom, of sufficient width and length to be steam-tight within the chamber *g*, is attached, or it may form a part thereof, a piston, *h*, the face *l* of which is flat-shaped, with its surface in a radial line from the axis of the disk, and the other face, *m*, made with a gradual curving direction from the disk to the outer end of the piston, for a purpose to be hereinafter specified.

*n* is the steam-valve, communicating with the interior of cylinder-chamber *g*, when open, through aperture $v$ in side plate, $p$, thereof, and through which steam passes from the steam-chest thereto. $q$ is the exhaust-port for the exhaust steam. Between the steam and exhaust ports $o$ and $q$ is inserted, through a slot, $r$, in the periphery of the cylinder, a curved-shaped partition plate or gate, $s$, which plate $s$ extends within and into the steam-space $g$ around the disk, and is of sufficient length and width to fit steam-tight within the same, dividing it, as seen in Fig. 3.

The outer end of the plate $s$ is attached to an arm, $t$, turning on a fulcrum or pivot at $u$ of the cylinder, from which fulcrum as a center the plate is curved. The plate $s$ is movable in and out of the cylinder at pleasure, and is to be made perfectly steam-tight therein, so that no steam can possibly escape by the same as the engine operates, which is now to be described.

Steam being admitted to the cylinder through its port, it impinges against the flat side of the piston, and by its expansive power drives it around within the chamber toward the partition-plate thereof, the steam on the opposite side of the piston and between it and the plate $s$ continually exhausting through and out at the exhaust-port $q$, thus rotating the disk and its shaft, and consequently directly operating the mechanism connected therewith, which plate the curved face of the piston, when it has reached, or nearly so, the same, is gradually caused to be lifted, thereby allowing the piston to pass freely under the same, when it falls by its own weight or by the force of springs attached thereto in any proper manner, and resumes its original position, the steam during this movement of the plate and piston being entirely cut off from the chamber by means of a projecting arm, $a'$, attached to the shaft of the disk and revolving with the same, and so arranged thereon as to properly rotate the steam-valve therefor, the impetus of the balance-wheel acquired by the previous rotation of the disk being sufficient to carry the piston beyond the same, and so on for any length of time desired. The steam-valve is immediately opened after the piston has entirely passed by the plate by means of another projecting arm, $b'$, of the disk-shaft, properly arranged to rotate the valve sufficiently therefor, when the same movement of the piston partition plate or gate and steam-valve again takes place.

It may be here remarked that the piston and its disk may be so formed, as is evident to all conversant with engines, and without impairing in the least degree its perfect operation, as to greatly relieve the frictional surfaces in contact with the cylinder—as, for instance, by hollowing out each side of the same, leaving a sufficiently wide rim around their peripheries or edges to make a steam-tight joint. And, furthermore, in lieu of using a movable gate-plate in connection with a fixed piston, as described, the reverse may be used—that is, a fixed gate and a movable piston so arranged upon its disk as to be susceptible of the proper movement; but I deem the arrangement described the most practical as well as most efficient and advantageous.

The partition-plate, in lieu of being raised by the direct action of the piston thereon, can be, it is evident, operated in various other modes—as, for instance, by connecting it with the axis of the disk through a series of any proper-arranged mechanical devices which will accomplish the desired result, and the gate also can be made of various shapes other than that described.

The machine or engine above described, it is apparent, can be adapted for various other purposes than that described—as, for instance, to the use of atmospheric air as a motor, to the measuring of gas or liquids, &c.—and therefore I do not intend to limit myself to any particular purpose to which it may be adapted.

I claim as new and desire to secure by Letters Patent—

The piston $h$ on the disk $f$, partition-plate $s$, the induction-port $n$, and eccentric cut-off $a'$ $b'$, all arranged and operating as herein specified.

J. T. WARREN.

Witnesses:
ALBERT W. BROWN,
M. M. LIVINGSTON.